(12) United States Patent
Basire

(10) Patent No.: US 9,718,960 B2
(45) Date of Patent: Aug. 1, 2017

(54) RECYCLING POLYAMIDE AIRBAGS

(75) Inventor: Charlotte Basire, Marennes (FR)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 13/817,605

(22) PCT Filed: Aug. 19, 2011

(86) PCT No.: PCT/EP2011/064315
§ 371 (c)(1),
(2), (4) Date: Feb. 19, 2013

(87) PCT Pub. No.: WO2012/025465
PCT Pub. Date: Mar. 1, 2012

(65) Prior Publication Data
US 2013/0150514 A1 Jun. 13, 2013

(30) Foreign Application Priority Data
Aug. 26, 2010 (FR) ..................... 10 56777

(51) Int. Cl.
| *C08L 77/06* | (2006.01) |
|---|---|
| *C08J 3/00* | (2006.01) |
| *C08J 11/06* | (2006.01) |
| *C08K 3/00* | (2006.01) |
| *C08K 11/00* | (2006.01) |
| *B29K 77/00* | (2006.01) |

(52) U.S. Cl.
CPC .............. *C08L 77/06* (2013.01); *C08J 3/005* (2013.01); *C08J 11/06* (2013.01); *C08K 3/0033* (2013.01); *C08K 11/005* (2013.01); *B29K 2077/00* (2013.01); *C08J 2300/30* (2013.01); *C08J 2377/00* (2013.01); *Y02W 30/701* (2015.05)

(58) Field of Classification Search
CPC . C08L 77/00; C08L 77/06; C08J 11/06; C08J 3/005; C08J 2377/00; C08J 2300/30; C08K 3/0033; C08K 11/005; B29K 2077/00
USPC ......... 524/445, 447, 449, 538; 521/40, 40.5, 521/48, 49, 49.8
See application file for complete search history.

(56) References Cited

U.S. PATENT DOCUMENTS

| 5,569,424 A | 10/1996 | Amour |
|---|---|---|
| 6,354,620 B1 * | 3/2002 | Budden et al. ............ 280/728.1 |
| 6,698,458 B1 | 3/2004 | Sollars, Jr. et al. |
| 2003/0009008 A1 * | 1/2003 | Takenaka et al. ........ 528/502 F |
| 2009/0087601 A1 | 4/2009 | Kobayashi et al. |
| 2009/0130417 A1 * | 5/2009 | Maeda et al. ................. 428/220 |
| 2010/0012623 A1 | 1/2010 | Mignani |

FOREIGN PATENT DOCUMENTS

| CN | 101173068 A | 5/2008 |
|---|---|---|
| EP | 2 042 649 A1 | 4/2009 |
| FR | 2 901 278 A1 | 11/2007 |
| JP | 2003-119330 A | 4/2003 |
| JP | 2003-183945 A | 7/2003 |
| JP | 2003-191239 A | 7/2003 |
| JP | 2004-18614 A | 1/2004 |
| JP | 2007-169816 A | 7/2007 |
| JP | 2009-097134 A | 5/2009 |
| WO | 01/12895 A1 | 2/2001 |

OTHER PUBLICATIONS

Machine translation of Tamura et al, JP 2003-191239, Jul. 8, 2003.*
Marsh, "Facing up to the recycling challenge," Reinforced Plastics, 2001, pp. 22-26, vol. 45, No. 6.
Perrin et al, "SYLTEC : un procede innovant pour le recyclage des materiaux composites a matrice thermodurcissable," Materiaux et Techniques, 2007, pp. 121-131, vol. 95 (English language abstract included).
International Search Report issued on Sep. 30, 2011, by the European Patent Office as the International Searching Authority in International Patent Application No. PCT/EP2011/064315.
Toyobo, "Toyobo Develops Recyclable Coated Fabric for Airbags", Oct. 6, 2010, pp. 1-3.

* cited by examiner

Primary Examiner — Frances Tischler
(74) Attorney, Agent, or Firm — Dentons US LLP

(57) ABSTRACT

A method for making a polyamide composition, in particular for molding, prepared by mixing a polyamide material, a powder made from airbag scraps, and optionally reinforcing fillers is described. Also described, is a method for recycling used airbags.

16 Claims, No Drawings

RECYCLING POLYAMIDE AIRBAGS

CROSS-REFERENCE TO PRIOR APPLICATIONS

This application is a National Stage of PCT/EP2011/064315, filed Aug. 19, 2011, and designating the United States (published in French on Mar. 1, 2012, as WO 2012/025465 A1), which claims priority under 35 U.S.C. §119 to FR 10/56777, filed Aug. 26, 2010, each hereby expressly incorporated by reference in its entirety and each assigned to the assignee hereof.

The present invention relates to a process for manufacturing a polyamide composition, especially by molding, obtained by mixing a polyamide material and a powder of safety airbag residues and optionally reinforcing fillers. The invention relates especially to a process for recycling safety airbags at the end of their service life.

PRIOR ART

Safety airbags, commonly known as airbags or air-bags, are inflatable protective bags used for protecting the occupants of a vehicle, in which a gas is very rapidly injected via an explosive chemical reaction, to inflate them and thus absorb impacts. When connected to impact detection sensors located at the front of the hood and at the base of the windshield, they become inflated and limit the risks of serious injury during an impact with a pedestrian or a vehicle. These articles generally comprise a polyamide-based bag, generally in the form of woven fibers, on several layers, and a silicone coating on one of the faces. Airbags are very predominantly manufactured by depositing a crosslinkable silicone composition to form a thin layer of silicone elastomer.

The problem arises of recycling the components of these articles and especially of recovering the plastic material. Specifically, it is very difficult to mechanically dissociate the silicone material from the plastic material. Chemical routes exist for doing this, but they have implementation drawbacks and they often impair the properties of the thermoplastic material.

There is thus a need to develop a process that is simple to perform, for optimum recycling of these articles, especially without adversely affecting or degrading the plastic matrix; and optionally while avoiding an additional treatment step.

It is known practice from Japanese patent application JP 2003-191239 to chop polyamide-based airbags into pieces and to extrude them to form granules that are ready to be used for the manufacture of molded articles. However, these articles obtained from spent polyamide material do not have satisfactory mechanical properties.

There is thus a need to upgrade polyamide-based airbags that are industrial waste or airbags at the end of their service life, for the manufacture of polyamide formulations which have properties similar or equivalent to the usual polyamide formulations.

INVENTION

One subject of the present invention is thus a process for manufacturing a polyamide composition, which makes it possible to recycle safety airbag residues, which are currently virtually not recycled and are discarded as waste, which, besides the costs incurred in such a disposal, poses problems as regards environmental protection.

This process consists in mixing, without heating or in the molten state, a polyamide material with a variable amount of a powder of safety airbag residues, and optionally additives and reinforcing or bulking fillers, for the preparation of polyamide-based compositions.

The compositions according to the invention may be compositions that may be used for preparing articles or the articles themselves, for example. The invention also relates to a polyamide composition that may be obtained via the process as described previously.

This simple and economical process makes it possible to obtain polyamide compositions that have good mechanical properties for various uses in numerous technical sectors, especially as a function of the proportion of safety airbag residues. It furthermore appears, entirely surprisingly, that the addition of powder of safety airbag residues makes it possible to increase the mechanical properties, especially the elastic modulus, the ultimate stress and the impact strength of polyamide compositions to which they are added. The present invention thus also relates to the use of powder of safety airbag residues for increasing the mechanical properties of a polyamide composition.

DETAILED DESCRIPTION OF THE INVENTION

For the purposes of the invention, the expression "safety airbag residues" means production waste such as cutouts or offshoots, generated especially during the steps of coating or of cutting out, or substandard products that are not marketable, or alternatively articles or pieces of articles at the end of their service life.

These residues are generally obtained from safety airbags based on thermoplastic resins, for instance polyamide, such as polytetramethyleneadipamide, polyester, polypropylene or polyurethane. These articles are generally in the form of woven fibers, on one or more layers, and generally comprise a coating based on silicone, polychloroprene, polyurethane, polyacrylate, polyamide, polyester, elastomeric polymers such as rubbers, polyolefins, fluorinated elastomers, EPDM or polychloroprene-based rubbers. Safety airbags generally do not contain any reinforcing and/or bulking fillers.

It is especially preferred to use polyamide-based safety airbag residues. It is particularly preferred to use polyamide-based residues comprising a silicone-based coating.

It is possible according to the invention to use airbags per se, and it is also possible to perform afterwards a treatment process for removing the coatings. Various physical or chemical treatments are known for dissociating the polyamide material from the material constituting the coating. Mention may be made especially of patent application WO 2007/135 140 to this effect.

The safety airbag residues, such as bags or bag remnants or bag cutouts or offshoots, are generally chopped or ground and then made into powder.

Said powder is preferentially a micrometric powder and advantageously has a particle size distribution of between 50 and 400 μm, more preferentially between 100 and 350 μm, more preferentially a particle size distribution D50 of between 50 and 400 μm and more preferentially between 100 and 350 μm.

The particle size distribution of objects may be obtained by laser scattering measurement, especially on a granulometer from Malvern, for example using the wet route module. The mesh size d50 is the size such that 50% of the particles are smaller than this size and 50% of the particles are larger than this size. The particle size analysis by laser scattering may be performed according to the indications of AFNOR standard ISO 13320-1.

By way of example, the particle size distribution may be measured by following the following protocol: a Malvern Mastersizer 2000 light-scattering granulometer equipped with a hydro S module is used, after suspending the sample in ethanol. The measuring conditions are as follows: stirring in the granulometer cuvette: 1400 rpm; Fraunhofer optical model; measuring range: 100 nm to 3000 µm.

The powder may especially be obtained according to usual known processes, known especially in the paper industry sector, for instance micronization, mechanical friction, or the use of a defibrator.

It is possible, for example, to perform micronization of safety airbag residues, which have generally been pre-ground, by micronization in a knife or disk micronizer equipped with a grille. This grille may have a mesh size of between 50 and 500 µm. According to such a process, two types of particle are generally observed after micronization: spherical particles and fibrous particles.

The powder according to the invention may comprise spherical or substantially spherical particles and/or fibrous particles. The powder according to the invention may comprise spherical particles with a diameter of between 15 and 200 µm and fibrous particles with a length of between 200 and 1100 µm.

The powder may be dried for the purpose of removing the water so as not to lead to hydrolysis of the polyamide during the subsequent melting processes.

The polyamide material may especially be in powder or granule form. The polyamide material may especially be added to the airbag residue powders in the form of the virgin polyamide granules, or in the form of granules comprising reinforcing or bulking fillers or various other additives conventionally used in the field.

Examples of polyamide types that may be mentioned include semicrystalline or amorphous polyamides, such as aliphatic or semiaromatic polyamides. Mention may be made especially of the (co)polyamides 6; 6.6; 4.6; 6.10; 6.12; 11 and 12, and/or mixtures, such as polyamides 6/6.6.

To improve the mechanical properties of the polyamide composition according to the invention, it may be advantageous to add thereto at least one reinforcing and/or bulking filler preferentially chosen from the group consisting of fibrous fillers such as glass fibers, carbon fibers and aramid fibers, and non-fibrous mineral fillers such as clays, kaolin, mica, wollastonite and silica. The degree of incorporation of reinforcing and/or bulking filler is in accordance with the standards in the field of composite materials. It may be, for example, a filler content of from 1% to 80%, preferably from 10% to 70% and especially between 20% and 50%, relative to the total weight of the composition.

The composition according to the invention may additionally comprise additives normally used in the manufacture of polyamide compositions intended to be molded. Thus, mention may be made of lubricants, flame retardants, plasticizers, nucleating agents, catalysts, resilience enhancers such as optionally grafted elastomers, light stabilizers and/or heat stabilizers, antioxidants, antistatic agents, dyes, pigments, matting agents, molding-aid additives or other conventional additives.

Compatibilizers may also be added between the polyamide material and the residues, for instance an aminosilane coupling agent or a maleic anhydride grafted polymer.

For the preparation of a polyamide composition, these fillers and additives may be added to the polyamide via common means suited to each filler or additive, for instance during the polymerization or as a molten mixture. The fillers are preferentially added to the polyamide via the molten route, especially during a step of extrusion of the polyamide, or via a solid route in a mechanical mixer, at the same time as the airbag residue powder; the solid mixture may then be melted, for example via an extrusion process.

The airbag residue powder may be mixed with a polyamide material in various ways. It is possible, for example, to perform mixing without heating, especially in a mechanical mixer, and then to melt the mixture, especially the polyamide, for example to manufacture granules, especially by using an extruder. It is also possible to place said mixture without heating in an injection press for the preparation of articles.

It is also possible to mix the airbag residue powder and the polyamide material with heating, especially in an extruder or an injection press; for the preparation of granules or articles. To this end, it is possible, for example, to add at the same time, or in a delayed manner, the airbag residue powder and the polyamide. It is possible, for example, to add the powder as a molten vein into the extruder.

It is possible, for example, to mix in an extruder molten polyamide material with the safety airbag residue powder, and optionally additives and reinforcing or bulking fillers, for the preparation of polyamide-based compositions, especially granules.

It is possible to remove the water by degassing, especially during the melting of the mixture of the polyamide material and of the residue powder, especially in the extruder.

Generally from 0.5% to 70% by weight and preferentially from 15% to 50% by weight of airbag residue powder is added relative to the total weight of the composition.

The compositions according to the invention may be used as starting material, for example as matrix, especially in the field of technical plastics, for example for preparing articles obtained by molding, by injection molding, by injection blow-molding, by extrusion or by extrusion blow-molding, or by spinning, or for obtaining films. The compositions may be used, for example, for the manufacture by extrusion of monofilaments, filaments, yarns and fibers. The articles may also be semifinished products in a wide variety of sizes that may be machined. Assemblies may be produced by welding or bonding, for example. The articles prepared by extrusion made especially be tubes, bars, profiled bars, plates, sheets and/or hollow bodies.

The molded components are prepared by melting the granules produced above and feeding the molten composition into injection-molding devices. The articles prepared by injection molding may be components in the motor vehicle, building or electricity sector.

Specific language is used in the description so as to facilitate the understanding of the principle of the invention. Nevertheless, it should be understood that no limitation of the scope of the invention is envisaged by the use of this specific language. Modifications, improvements and perfections may especially be envisaged by a person who is familiar with the technical field concerned, on the basis of his own general knowledge.

The term "and/or" includes the meanings "and", "or" and all the other possible combinations of the elements connected to this term.

Other details and advantages of the invention will become more clearly apparent in the light of the examples given below purely by way of indication.

EXPERIMENTAL SECTION

The compounds used in the examples are as follows:
PA66: polyamide 66 sold under the name Stabamid™ 27AE1 by the company Rhodia Airbag residues about 1 cm² in size. The airbags used are waste at the end of their service life, ground into pieces, based on polyamide 66 and coated on one face with crosslinked silicone. These residues are obtained by grinding in a Herbold mill comprising a row of fixed knives. The content of silicone polymer is 10% by weight Airbag residue powder that has been micronized and then screened through a 100 µm grille, with a particle size distribution d50 of 100 µm. The content of silicone polymer is 10% by weight E type standard glass fibers Additives: heat stabilizers and antioxidants The airbag residue powder is obtained by micronization of the airbag residues about 1 cm² in size described previously, using a Herbold micronizer with a row of fixed knives and a row of mobile knives, with a maximum rotation speed of 1500 rpm approximately, and a 100 µm grille.

Example 1

Preparation of Filled Formulations Based on PA 66, Containing Between 0 and 30% by Weight of Airbags at the End of their Service Life The experiments were performed on a Leistritz laboratory twin-screw extruder (screw diameter D of 34 mm, axis separation of 30 mm and length of 35 mm).

The sheath temperature was kept constant at 285° C. over the entire length of the screw. The screw profile was designed so that the introduction of the airbag residues or of the airbag residue powder is performed as a molten vein and so that degassing is performed at the extruder tail. For each of the tests, the screw rotation speed is 290 rpm and the extruder throughput is 10 kg/h.

After extrusion, the granules were injected on an Arburg press (closing force 35 t, screw diameter 30 mm, screw length 15 mm, maximum molten pressure 1290 bar).

Each component was made with a melting temperature of 285° C. and a mold temperature of 80° C. All the formulations comprise 30% by weight of glass fibers.

The tensile characteristics were evaluated on DAM components according to ISO standard 527/1A (Zwick 1464) under the following conditions: extensometer L0=25 mm, speed during the modulus: 1 mm/minute, determination of the modulus between 0.05% and 0.25% of strain, test speed: 5 mm/minute).

The characteristics of the various formulations are collated in Table 1 below.

TABLE 1

| Formulations | Airbag residues (%/p) | Resilience (kJ/m²) | Modulus E (Mpa) | Ultimate stress (Mpa) | Ultimate strain (%) |
|---|---|---|---|---|---|
| C1 | 0 | 82 | 10300 | 184 | 3 |
| C2 | 26% residues | 62 | 9360 | 149 | 3.1 |
| 1 | 17% powder | 78 | 10000 | 173 | 3.5 |
| 2 | 30% powder | 73 | 9600 | 156 | 4 |

Maintenance of the mechanical properties is thus observed with the formulations according to the invention comprising coated airbag powder when compared with the addition of simply ground airbag residues.

The invention claimed is:

1. A process for producing articles, the process comprising at least one step of mixing in a molten state a polyamide material with a safety airbag residue powder, wherein said residue is based on a polyamide comprising a silicone coating, and wherein said powder is a micrometric powder having a particle size $D_{50}$ of between 50 µm and 400 µm, further comprising:
    forming granules from the mixture of polyamide material with the safety airbag residue powder; and
    forming articles from the granules by at least one of: molding, injection molding, injection blow-molding, extrusion, extrusion blow-molding or spinning.

2. The process as defined by claim 1, wherein the powder comprises spherical or substantially spherical particles and/or fibrous particles.

3. The process as defined by claim 1, wherein from 0.5% to 70% by weight of residue is mixed relative to the total weight of the composition.

4. The process as defined by claim 1, wherein the polyamide material is added to the residue in the form of virgin polyamide granules or in the form of granules of virgin polyamide comprising a reinforcing or bulking filler and another additive.

5. The process as defined by claim 1, further comprising adding a reinforcing or bulking filler wherein the reinforcing or bulking filler is selected from the group consisting of a fibrous filler and a non-fibrous mineral filler.

6. The process as defined by claim 5, wherein when the filler is a fibrous filler, the fibrous filler is a glass fiber, a carbon fiber or an aramid fiber.

7. The process as defined by claim 5, wherein when the filler is a non-fibrous mineral filler, the non-fibrous filler is a clay, a kaolin, a mica, a wollastonite or a silica.

8. The process as defined by claim 3, wherein from 15% to 50% by weight of the residue is mixed relative to the total weight of the composition.

9. A process for producing articles, the process comprising at least one step of mixing, without heating, a polyamide material with a safety airbag residue powder, wherein said residue is based on a polyamide comprising a silicone coating, and wherein said powder is a micrometric powder having a particle size $D_{50}$ of between 50 µm and 400 µm, further comprising:
    melting the mixture of polyamide material with the safety airbag residue powder;
    forming granules from the melted mixture; and
    forming articles from the granules by at least one of: molding, injection molding, injection blow-molding, extrusion, extrusion blow-molding or spinning.

10. The process as defined by claim 9, wherein the powder comprises spherical or substantially spherical particles and/or fibrous particles.

11. The process as defined by claim 9, wherein from 0.5% to 70% by weight of residue is mixed relative to the total weight of the composition.

12. The process as defined by claim 9, wherein the polyamide material is added to the residue in the form of virgin polyamide granules or in the form of granules of virgin polyamide comprising a reinforcing or bulking filler and another additive.

13. The process as defined by claim 9, further comprising adding a reinforcing or bulking filler wherein the reinforcing or bulking filler is selected from the group consisting of a fibrous filler and a non-fibrous mineral filler.

14. The process as defined by claim 13, wherein when the filler is a fibrous filler, the fibrous filler is a glass fiber, a carbon fiber or an aramid fiber.

15. The process as defined by claim 13, wherein when the filler is a non-fibrous mineral filler, the non-fibrous filler is a clay, a kaolin, a mica, a wollastonite or a silica.

16. The process as defined by claim 11, wherein from 15% to 50% by weight of the residue is mixed relative to the total weight of the composition.

\* \* \* \* \*